Figure 1:
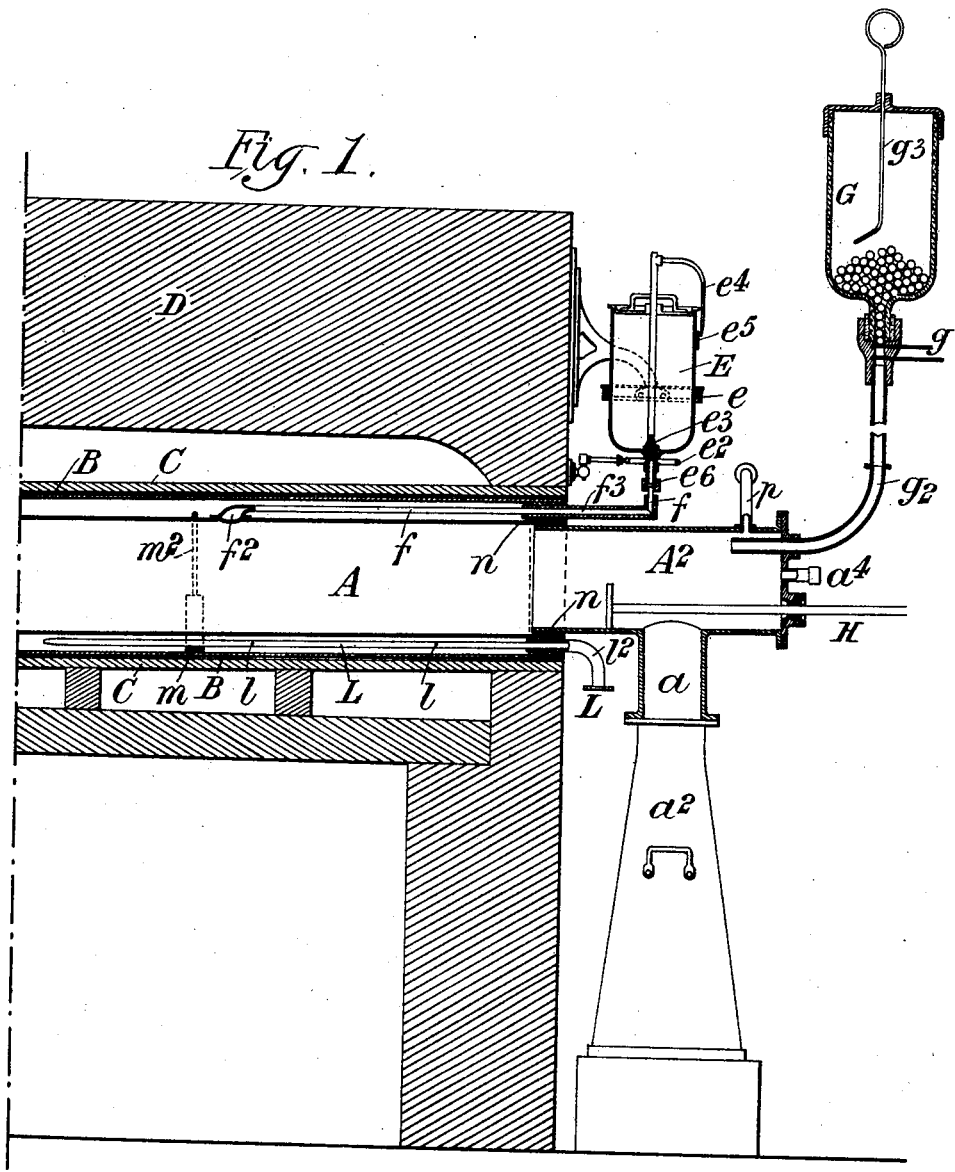

No. 760,997. PATENTED MAY 24, 1904.
J. A. KENDALL.
APPARATUS FOR MANUFACTURING CYANIDS.
APPLICATION FILED JAN. 18, 1904.
NO MODEL.
2 SHEETS—SHEET 1.

WITNESSES:
F. W. Wright
Walter Abb

INVENTOR
James Alfred Kendall
BY
Howson and Howson
HIS ATTORNEYS.

No. 760,997. PATENTED MAY 24, 1904.
J. A. KENDALL.
APPARATUS FOR MANUFACTURING CYANIDS.
APPLICATION FILED JAN. 18, 1904.
NO MODEL. 2 SHEETS—SHEET 2.
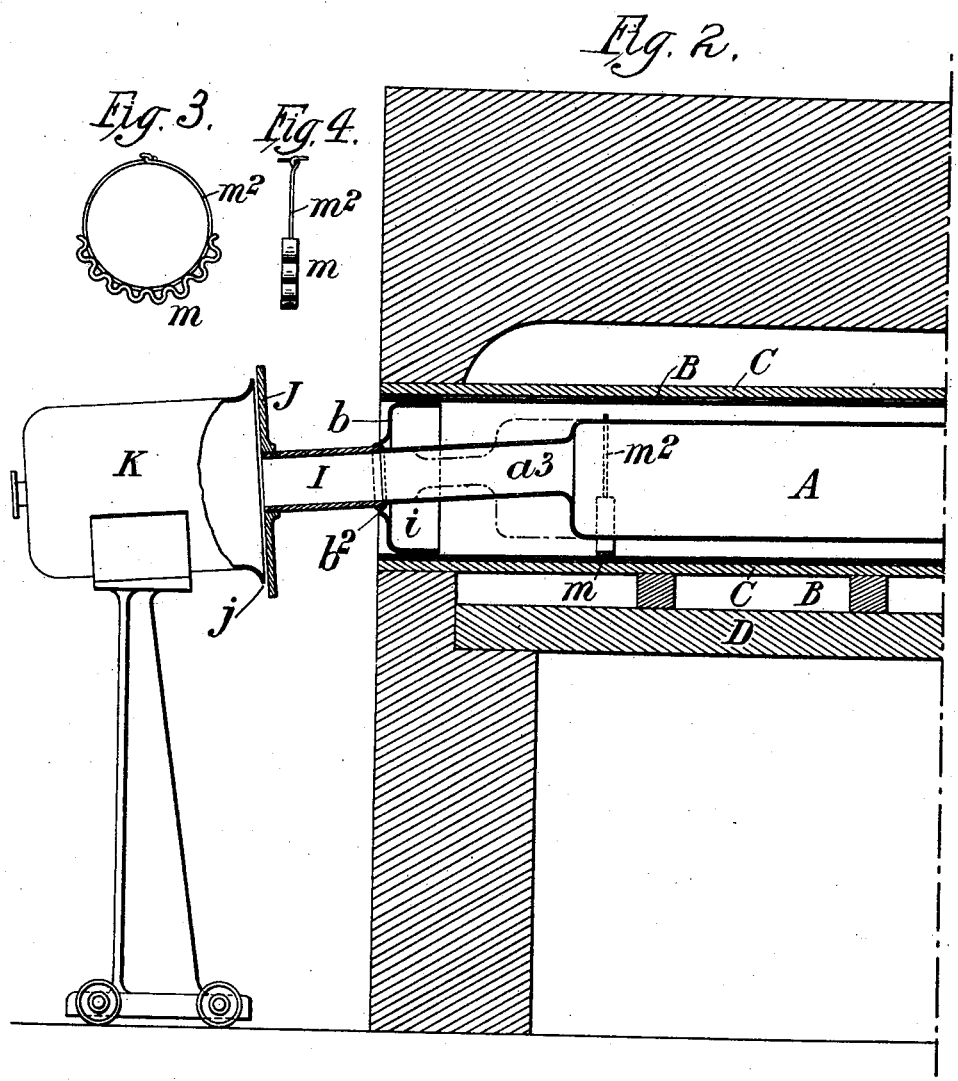

No. 760,997.

Patented May 24, 1904.

UNITED STATES PATENT OFFICE.

JAMES ALFRED KENDALL, OF STREATHAM, LONDON, ENGLAND, ASSIGNOR OF ONE-HALF TO JOSEPH WILSON SWAN, OF HOLLAND PARK, LONDON, ENGLAND.

APPARATUS FOR MANUFACTURING CYANIDS.

SPECIFICATION forming part of Letters Patent No. 760,997, dated May 24, 1904.

Application filed January 18, 1904. Serial No. 189,631. (No model.)

*To all whom it may concern:*

Be it known that I, JAMES ALFRED KENDALL, manufacturing chemist, a subject of the King of Great Britain and Ireland, residing at 21 Shrubbery road, Streatham, in the county of London, England, have invented certain new and useful Improvements in Apparatus to be Employed in the Manufacture or Production of Cyanids, of which the following is a specification.

This invention relates to apparatus for use in the manufacture or production of cyanids wherein the cyanid-making materials are treated in an inner vessel, of nickel or cobalt, surrounded by a jacket into which hydrogen is passed, the object of the present invention being to provide apparatus which is more durable and by which the process is conducted more readily and with greater efficiency than hitherto, the improvements being such as to cause the substances used and the products of their combination to proceed in their proper course, so that the process can be worked with greater regularity.

In the accompanying drawings, Figure 1 is a central sectional side elevation of the receiving end of an apparatus of this invention. Fig. 2 is a central sectional side elevation of the discharge end of such an apparatus. Figs. 3 and 4 are detail views of the supports for the tube A.

A is the vessel, of nickel or cobalt, in which the reaction to form the cyanid is carried on, and B is the outer vessel or jacket, which may be of refractory clay, or nickel, cobalt, or fine iron, inclosed in a refractory covering C, the whole being set in a brickwork or other suitable setting D, in which the heating devices are situated.

E is a pot from which when fused caustic alkali is used it can be run into the vessel A. The said pot E is supported by a ring-bracket $e$ and heated by a ring of gas-burners $e^2$ and provided with a rotatable valve $e^3$, having in it a passage which by rotary movement of the valve opens, closes, and controls a passage through the bottom of the pot E, leading into a nickel or cobalt tube $f$, passing along the space for hydrogen between the vessel A and the vessel or jacket B and autogenously soldered at $f^2$ to an opening in the vessel A at a part which in working is exposed to a high temperature.

$f^3$ is a tube, of steel or other suitable material, to protect the outer part of the tube $f$. The object of autogenously soldering the tube to the opening in the vessel at a part subjected to high temperature is to enable the alkali to be delivered into the vessel so far in advance of the end opposite the outlet for cyanid that the resulting vapors of alkali are certain to be carried forward by the stream of nitrogen gas, thus overcoming a difficulty in apparatus of this kind as hitherto made due to the alkali being liable to creep back along the outside of the tube by which it was delivered into the retort, which caused trouble by accumulating and adhering in the end piece. In my present arrangement the alkali does not creep back, as the hydrogen surrounding the vessel so affects the nickel as to prevent the alkali adhering to it at high temperatures.

The stem of the valve $e^3$ may be provided with a pointer $e^4$, moving over a scale $e^5$, to indicate the adjustment of the valve $e^3$.

The pot E is made of nickel or other material which will not injuriously affect or be affected by the fused caustic alkali contained in the said pot E, which pot and the tube $f$ are preferably connected by a union-joint, as shown at $e^6$, to allow of the removal of the pot.

G is a vessel for containing alkali carbonate when that is to be employed in the process, the said alkali carbonate being made into balls or other suitable forms which will fall through an orifice in the bottom of the said vessel G and pass at the required intervals of time through a double valve or other device $g$ (operated by any suitable means to allow of a ball or the like or a uniform quantity of alkali carbonate passing as required) and down a tube $g^2$ of sufficient length to cause the balls or the like to acquire sufficient velocity to be projected to a sufficient distance into the vessel A. A stirrer $g^3$ may be used for loosening the balls or the like of alkali carbonate.

The carbon to be used in the process may be supplied by a similar device, if desired, (except that a time-operated discharge-valve is not so important as in the case of the alkaline carbonate,) or it may be otherwise introduced into the vessel A.

H is a rake by which material can be pushed along the floor of the vessel A, or any waste material can be removed from the said vessel through the opening $a$ and caused to fall into a receiver $a^2$.

In apparatus of the kind to which this invention relates there has been used a "continuation" from the retort, consisting of an inclined tube the extremity of which is outside the hydrogen-jacket. When making cyanid of potassium, (the cyanid most used in commerce,) the said inclined tube has been made of nickel; but I have found that the end of this tube soon becomes rotten and pervious to the melted cyanid flowing down it, so that cyanid is lost and is liable to come into contact with and cause damage to the brickwork of the furnace. I overcome this objection as follows: At the forward end of the vessel A is a nickel or cobalt continuation $a^3$, to which is fused a tube I, of steel or nickel-steel, the joint at $i$ being so placed that it is just within the jacket-space or so situated that in work it is exposed to a red heat and protected by the hydrogen in or passing from the jacket-space, the forward end of the jacket-space being closed (except an orifice for the exit of hydrogen) by an end piece $b$, of nickel or cobalt. The said orifice may take the form of an annulus, as shown at $b^2$, at which the escaping hydrogen burns. By this improved arrangement all the nickel or cobalt of the continuation can be kept red-hot and also be protected by hydrogen, so that the nickel or cobalt is prevented from becoming rotten. The steel or nickel-steel tube attached is not liable to become rotten under the conditions which so damaged the nickel tube in the former arrangement, and the said steel or nickel-steel tube allows the condensed cyanid to flow clear of the brickwork of the furnace.

The end of the inner vessel A may, if desired, be brought nearer to the end of the jacket B and have a contraction in it, as shown in dotted lines. To the outer end of the tube I may be screwed or otherwise secured a plate J, down which cyanid formed and passing off flows and escapes at $j$ into a receptacle placed beneath.

K is a box which can be brought up near to the plate J to prevent undue access of air, the said box K being provided with an opening for the escape of gas. The plate prevents any creeping backward of cyanid from the extremity along the outside of the steel tube. The said plate also constitutes, in conjunction with the box, a chamber which can be put together or taken apart very quickly. If the cyanid be allowed to pass in a heated condition from the end of the tube while the air has free access to it, it is liable to burn and become partly oxidized into carbonate; but by bringing the box close up to the plate the burning of the cyanid is prevented. This arrangement of the plate and box is much more convenient to use than a receiving vessel, as in the arrangement hitherto used, as the plate receives a considerable amount of heat from the furnace and keeps the cyanid from solidifying in the extremity of the tube.

The end piece $b$ may be covered outside with refractory clay or other protective material.

L is a tube of nickel or cobalt by which the hydrogen is admitted to the jacket-space. The said tube L extends some distance into the jacket-space and besides being open at its end is provided with openings, as indicated at $l$, at intervals, so that the hydrogen is properly distributed in the jacket-space.

I have shown supports (illustrated separately at the left-hand end of the figure) on which the vessel A rests, these supports consisting of corrugated strips of nickel or cobalt $m$, bound to the vessel A by wires $m^2$, securely fastened to the said strip $m$. The strips $m$ may be covered with a paste of magnesia and water to prevent adhesion of the jacket B at high temperatures.

The front end piece $A^2$ is preferably of nickel-iron alloy and fits tightly in the end of the vessel A, the end plate being arranged so that it can be removed.

$n$ is a filling of refractory material between the vessel A and jacket B.

$p$ is the inlet-tube for nitrogen or its equivalent (such as ammoniacal gas) to be used in the process.

$a^4$ is a sight inspection-tube closed by glass or mica, through which the interior of the vessel A can be seen.

Although in my claims I have used the expression "nickel," I do not limit myself to that metal alone, as any material which is permeable to hydrogen and will not become carbureted will answer the purpose. For instance, cobalt may be used; but as at present commercially produced it is less satisfactory than nickel.

I claim as my invention—

1. An apparatus for making cyanid the said apparatus consisting of an inner vessel of nickel, with a continuation both surrounded by a jacket, an external tube fused to the said continuation the joint being so situated as to be protected by hydrogen in, or passing from, the jacket-space, and means for applying heat, and also means for supplying hydrogen to the jacket-space, and means for supplying the agents which take part in the reaction, substantially as hereinbefore described.

2. An apparatus for making cyanids the said apparatus consisting of an inner vessel of nickel, and a continuation, both surrounded by a jacket, an external tube, fused to the said continuation, the joint being so situated as to be protected by hydrogen in, or passing from, the jacket-space, and means for applying heat, and also means for supplying hydrogen to the jacket-space, and means for supplying the agents which take part in the reaction, and a plate secured to the aforesaid external tube, and a box for protecting the outcoming cyanid.

3. An apparatus for making cyanids the said apparatus consisting of an inner vessel of nickel, and a continuation, both surrounded by a jacket, an external tube, fused to the said continuation, the joint being so situated as to be protected by hydrogen in, or passing from, the jacket-space, and means for applying heat, and also means for supplying hydrogen to the jacket-space, and means for supplying the agents which take part in the reaction, the fused caustic alkali being supplied from a vessel provided with an outlet-tube of nickel, extending partly through the space for hydrogen and autogenously soldered in an opening in the nickel, inner vessel at a point subjected, in work, to a high temperature.

In testimony whereof I affix my signature in presence of two witnesses.

JAMES ALFRED KENDALL.

Witnesses:
HENRY WILLIAM GOLDSACK,
ALFRED THOMAS FORSTER.